(12) United States Patent
Casey et al.

(10) Patent No.: US 11,895,165 B2
(45) Date of Patent: *Feb. 6, 2024

(54) IN-LINE, IN-CALL AI VIRTUAL ASSISTANT FOR TELECONFERENCING

(71) Applicant: CenturyLink Intellectual Property LLC, Broomfield, CO (US)

(72) Inventors: Steven M. Casey, Littleton, CO (US); Stephen Opferman, Denver, CO (US); Felipe Castro, Erie, CO (US); Jeff Leonard, Broomfield, CO (US)

(73) Assignee: CenturyLink Intellellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,125

(22) Filed: Mar. 3, 2023

(65) Prior Publication Data

US 2023/0208891 A1 Jun. 29, 2023

Related U.S. Application Data

(63) Continuation of application No. 17/561,861, filed on Dec. 24, 2021, now Pat. No. 11,601,479, which is a continuation of application No. 16/543,190, filed on Aug. 16, 2019, now Pat. No. 11,233,831.

(60) Provisional application No. 62/881,253, filed on Jul. 31, 2019.

(51) Int. Cl.
*H04L 65/1069* (2022.01)
*H04L 67/025* (2022.01)
*H04L 65/1059* (2022.01)
*H04L 67/53* (2022.01)

(52) U.S. Cl.
CPC ...... *H04L 65/1069* (2013.01); *H04L 65/1059* (2013.01); *H04L 67/025* (2013.01); *H04L 67/53* (2022.05)

(58) Field of Classification Search
CPC ................... H04L 65/1069; H04L 67/1059
See application file for complete search history.

(56) References Cited

U.S. PATENT DOCUMENTS

| | | | |
|---|---|---|---|
| 10,742,695 B1 | 8/2020 | Brown | |
| 11,233,831 B2* | 1/2022 | Casey | ............... H04L 65/1104 |
| 11,445,063 B1* | 9/2022 | Driemeyer | ........... H04L 51/046 |
| 11,601,479 B2* | 3/2023 | Casey | ............... H04L 65/1046 |
| 2002/0131395 A1 | 9/2002 | Wang | |
| 2006/0098624 A1 | 5/2006 | Morgan | |
| 2008/0075240 A1* | 3/2008 | Ramanathan | ....... H04M 7/0042 379/88.12 |
| 2008/0212764 A1* | 9/2008 | Fukuta | ............. H04M 3/42195 379/211.02 |

(Continued)

*Primary Examiner* — Douglas B Blair

(57) ABSTRACT

Novel tools and techniques for providing an in-line AI virtual assistant are provided. A system includes a session border controller coupled to an end-user device, and a session initiation protocol stack. The session initiation protocol stack includes a processor, and non-transitory computer readable media comprising instructions executable by the processor to: receive, from the session border controller, a call invite request; provision, via the AI virtual assistant service, an AI virtual assistant instance in response to the call invite request; and join the AI virtual assistant instance to a call with the end-user device.

17 Claims, 7 Drawing Sheets

(56) References Cited

U.S. PATENT DOCUMENTS

| | | |
|---|---|---|
| 2010/0061539 A1* | 3/2010 | Cloran .................. G06Q 30/02 |
| | | 379/202.01 |
| 2010/0199320 A1 | 8/2010 | Ramanathan |
| 2010/0223389 A1 | 9/2010 | Ananthanarayanan |
| 2012/0263175 A1 | 10/2012 | Wang |
| 2014/0040748 A1* | 2/2014 | Lemay ............... G06F 3/04817 |
| | | 715/728 |
| 2014/0214972 A1 | 7/2014 | Nemani |
| 2015/0088514 A1* | 3/2015 | Typrin .................... G10L 17/00 |
| | | 704/231 |
| 2016/0366189 A1 | 12/2016 | Hart |
| 2017/0019437 A1 | 1/2017 | Phadnis |
| 2017/0026424 A1 | 1/2017 | Sandgren |
| 2018/0097851 A1 | 4/2018 | Phadnis |
| 2018/0191907 A1 | 7/2018 | Herrin |
| 2019/0005955 A1* | 1/2019 | Bhattacharya .......... G10L 15/08 |
| 2019/0014155 A1* | 1/2019 | Synal .................... H04L 65/401 |
| 2019/0332400 A1* | 10/2019 | Spoor ..................... G06F 3/013 |
| 2019/0339784 A1* | 11/2019 | Lemay .................. G06F 1/3206 |
| 2019/0392395 A1* | 12/2019 | Valliani ............... G06Q 10/109 |
| 2020/0145616 A1* | 5/2020 | Nassar .................. H04M 3/567 |
| 2020/0244788 A1* | 7/2020 | Adams .................. H04M 1/271 |
| 2020/0372140 A1 | 11/2020 | Jaber |
| 2021/0021558 A1* | 1/2021 | Mahmoud ............. H04L 51/046 |
| 2021/0037064 A1 | 2/2021 | Casey |
| 2022/0051674 A1* | 2/2022 | Pattnaik ................. H04W 4/30 |
| 2022/0124126 A1 | 4/2022 | Casey |

* cited by examiner

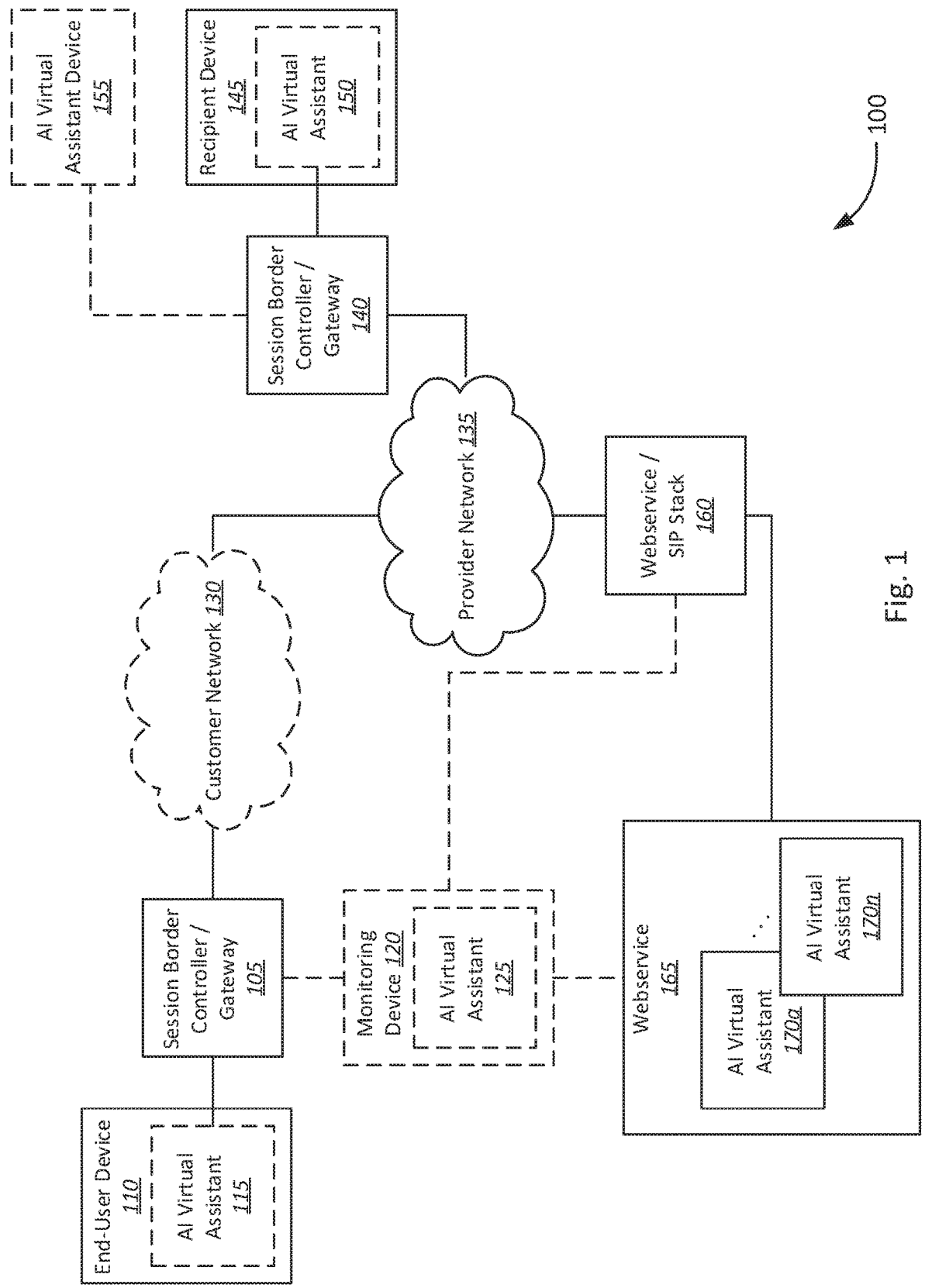

IN-LINE, IN-CALL AI VIRTUAL ASSISTANT FOR TELECONFERENCING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to systems for providing in-line call functionality, and more specifically to systems for providing an in-line call AI assistant in a call path.

BACKGROUND

Artificial intelligence (AI) virtual assistants, also referred to as voice assistants or personal assistants, have become commonly available in many devices and for many applications. Virtual assistants are used to perform various tasks and to answer queries from a user of the virtual assistant. Typically, virtual assistants are invoked by a user on respective end-devices, which may host the virtual assistant locally or access the virtual assistant via a network server hosting the virtual assistant. Typically, virtual assistants are invoked by a user through a voice command or by speaking specific term for invoking the virtual assistant. Other examples may include invoking the virtual assistant manually through one or more input commands such as pressing a button, using a dedicated user interface for interacting with the virtual assistant, opening a program, navigating to a website with the desired virtual assistant.

Thus, conventionally, users connect to and interact with a virtual assistant in a point-to-point manner. When users call other parties, or take part in a teleconference with multiple parties, parties to the call access respective instances of a virtual assistant on their own respective devices to perform functions and/or answer questions. However, interaction is limited to individual parties and their respective virtual assistants, and other parties are not typically able to interact with others' sessions with their respective virtual assistants.

Accordingly, tools and techniques for providing an in-call, in-line AI virtual assistant are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 1 is a schematic block diagram of a system for providing an in-line AI virtual assistant, in accordance with various embodiments;

DETAILED DESCRIPTION OF CERTAIN EMBODIMENTS

Figure 2A:
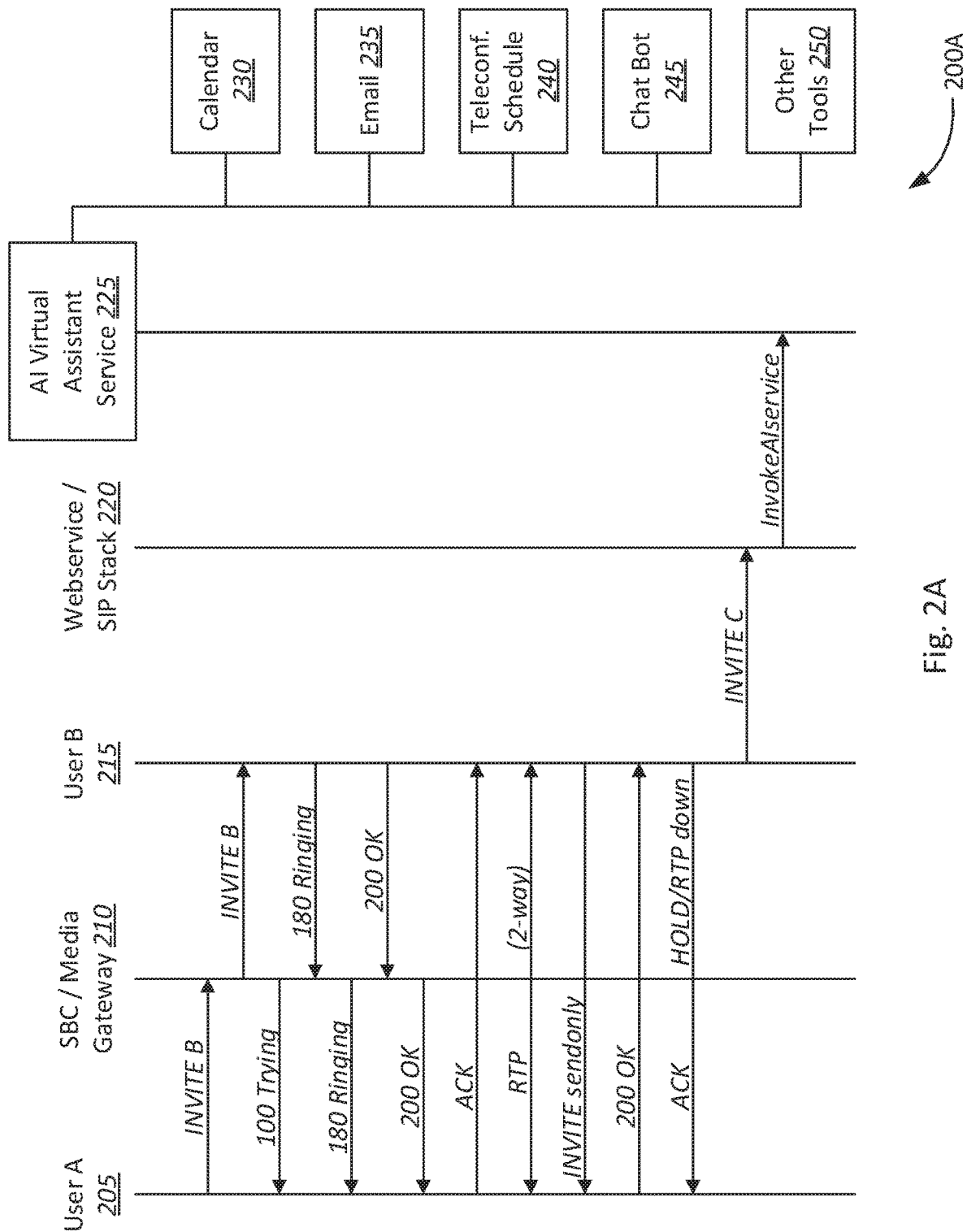
FIG. 2A is a sequence diagram of invoking an in-line AI virtual assistant, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method may comprise one or more procedures, any or all of which are executed by a computer system. Correspondingly, an embodiment may provide a computer system configured with instructions to perform one or more procedures in accordance with methods provided by various other embodiments. Similarly, a computer program may comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for providing an in-line AI virtual assistant. The system includes a session border controller, and a session initiation protocol stack. The session border controller may be coupled to an end-user device, wherein the end-user device is configured to place a session initiation protocol call to a recipient device. The session initiation protocol stack may be in communication with an in-line artificial intelligence (AI) virtual assistant service. The session initiation protocol stack further includes a processor, and non-transitory computer readable media comprising instructions executable by the processor to receive, from the session border controller, a call invite request, provision, via the AI virtual assistant service, an AI virtual assistant instance in response to the call invite request, and join the AI virtual assistant instance to the session initiation protocol call with the end-user device.

In another aspect, an apparatus for providing an in-line AI virtual assistant is provided. The apparatus includes a processor, and non-transitory computer readable media comprising instructions executable by the processor to receive, from a session border controller, a session initiation protocol call invite request, provision, via an artificial intelligence (AI) virtual assistant service, an AI virtual assistant instance in response to the session initiation protocol call invite request, wherein the AI virtual assistant is provisioned with a respective uniform resource identifier, and join the AI virtual assistant instance to a session initiation protocol call with an end-user device.

In a further aspect, a method for providing an in-line AI virtual assistant is provided. The method includes receiving, from a session border controller, a call invite request, provisioning, via an AI virtual assistant service, an artificial intelligence (AI) virtual assistant instance in response to the call invite request, wherein the AI virtual assistant is provisioned with a respective uniform resource identifier, and joining, via a session initiation protocol stack, the AI virtual assistant instance to a session initiation protocol call with an end-user device.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic block diagram of a system 100 for providing an in-line AI virtual assistant. In various embodiments, the system 100 includes a session border controller (SBC) (commonly referred to as a gateway) 105, end-user device 110, local AI virtual assistant 115, monitoring device 120, AI virtual assistant 125, customer network 130, provider network 135, a recipient SBC 140, recipient device 145, recipient local AI virtual assistant 150, AI virtual assistant device 155, a webservice/session initiation protocol (SIP) stack 160, webservice 165, and one or more AI virtual assistant instances 170a-170n. It should be noted that the various components of the system 100 are schematically illustrated in FIG. 1, and that modifications to the system 100 may be possible in accordance with various embodiments.

In various embodiments, the SBC 105 may be coupled to an end-user device 110, which may further include a local AI virtual assistant 115. The SBC 105 may further be coupled to a monitoring device 120, which may include a second AI virtual assistant 125. The SBC 105 may be coupled to a customer network 130, and further the customer network 13 may be coupled to the provider network 135. The provider network 135 may further be coupled to a second SBC 140, which may in turn be coupled to a recipient device 145 and AI virtual assistant device 155. The recipient device 145 may further include an AI virtual assistant 150. The provider network 135 may also be coupled to a webservice/SIP stack 160, which may be coupled to the webservice 165. The webservice 165 may include one or more AI virtual assistant instances 170a-170n. In some embodiments, the webservice/SIP stack 160 may alternatively be coupled to the monitoring device 120, which may be coupled to the webservice 165.

In various embodiments, the SBC 105 may be associated with an end-user device 110, and through which a user may place a call to a recipient. Accordingly, the SBC 105 may be coupled to one or more client devices, including the end-user device 110, and be configured to route, receive, and manage calls over the customer network 110. End-user device 105 may therefore include, without limitation, telephone (e.g., VoIP phones, smartphones), computers, tablets, or any other device capable of running a calling client (e.g., VoIP client) and/or otherwise make calls (e.g., voice, video, and/or text). In some embodiments, the SBC 105 may be configured to manage call data within an enterprise network environment, managing calls between client devices on the enterprise network, and calls with external parties. In further embodiments, the SBC 105 may be deployed by a service provider and configured to service one or more individual customers of the service provider.

The SBC 105 may be configured to include a SIP server table including one or more unique uniform resource identifiers (URIs), respectively assigned to each client device managed by the SBC 105, including the end-user device 110. The URI may include, for example, a SIP address for the end-user device 110, and in some embodiments, the monitoring device 120. In some embodiments, the monitoring device 120 may be a device located on the customer network 130, and coupled to the SBC 105. In some examples, when a call is initiated by the end-user device 110 to a recipient device 145, the end-user device 110 may be configured to request that the monitoring device 120 join the call, or be added to the call by the SBC 105. For example, the SBC the end-user device 105 may generate a request that the monitoring device 120 join the call, or that the monitoring device 120 be added to the call. The SBC 105 may then invite the monitoring device 120 to join the call, or the monitoring device 120 may be added to the call by the SBC 105. Alternatively, in some embodiments, each time a call is initiated by the end-user device 110, the SBC 105 may be configured to automatically join the monitoring device 120 in the call. Thus, in some embodiments, the SBC 105 may be configured to automatically invite and/or join a dedicated monitoring device 120. When a call is made by the end-user device 110, a three-way call, conference, or other multiple-party call may be initiated to include the monitoring device 120. Automatically included or invoked.

Alternatively, in some embodiments, the monitoring device 120 may be part of a webservice/SIP stack 160 for the AI virtual assistant. Thus, each time a call is placed by the end-user device 110, the SBC 105 may send in invite to the monitoring device 120 via the webservice/SIP stack 160. The webservice SIP stack 160 may then invite the monitoring device 120 to join the call, or otherwise add the monitoring device 120 to the call. For example, in some embodiments, the webservice/SIP stack 160 may be configured to determine whether a user associated with the end-user device 110 is authorized to invoke the AI virtual assistant 125, 170a-170n function of the webservice 165. If it is determined that the user is authorized to access the webservice 165, the webservice/SIP stack 160 may further be configured to connect the monitoring device 120 to the call.

In further embodiments, an AI virtual assistant device 155 may be joined to the call via a recipient SBC 140. For example, when a call is placed to the recipient device 145, the recipient SBC 140 may automatically connect the AI virtual assistant device 155 to the call. As previously described, the recipient SBC 140 may be configured to joint he AI virtual assistant device 155 as a three-way call, conference call, or other multi-party call. Thus, in some examples, the AI virtual assistant device 155 may also be a monitoring device, like the monitoring device 120.

In various embodiments, the SBC 105 and/or recipient SBC 140, and webservice/SIP stack 160 may be configured to determine whether a customer (e.g., the party invoking the AI virtual assistant 115, 125, 150, 155, 170a-170n) is authorized to receive the service. For example, in some embodiments, in various embodiments, a party on the call may invoke the AI virtual assistant. The party invoking the AI virtual assistant may, in some examples, be unknown to the SBC 105, recipient SBC 140, and/or webservice/SIP stack 160. Accordingly, the SBC 105, recipient SBC 140, and/or the webservice/SIP stack 160 may be configured to determine whether any party in the call/session is authorized to invoke the AI virtual assistant 115, 125, 150, 155, 170a-170n. In some further embodiments, the monitoring device 120 may be added to the call in response to a determination that a party in the call is authorized to invoke the AI virtual assistant 115, 125, 150, 155, 170a-170n. If it is determined that a party in the call is authorized to invoke the AI virtual assistant 125, the SBC 105, recipient SBC 140, and/or webservice/SIP stack 160 may initialize/provision an AI virtual assistant instance 170a-170n, which may further be added to the call by the SBC 105, recipient SBC 140, and/or webservice/SIP stack 160 as appropriate. For example, in some embodiments, the AI virtual assistant instance 170a-170n may be provisioned by the webservice 165 as an additional party with a respective URI to be added to the call. Accordingly, in various embodiments, the webservice/SIP stack 160 may include, without limitation, one or more server computers configured to provide the AI virtual assistant service and run a SIP stack to manage calls to various AI virtual assistant instances.

In some further embodiments, the AI virtual assistant 115 may be an instance of the AI virtual assistant that runs locally on an end-user device. Accordingly, the AI virtual assistant 115 may have a URI separate from the URI of the end-user device 110 via which a caller may communicate. For example, in some embodiments, the local AI virtual assistant 115 may include a virtual machine to which a respective URI is assigned, and through which the local AI virtual assistant 115 may join a call. Accordingly, in some embodiments, in response to a determination that the user is authorized to invoke the AI virtual assistant 115, 125, 150, 155, a respective local instance of an AI virtual assistant 115, 125, 150, 155 may be authorized to be added to the call. Similarly, in some embodiments, the recipient device 145 may include a recipient local AI virtual assistant 150, which may have a separate URI from the recipient device 145.

In various embodiments, the monitoring device 120 and/or AI virtual assistant device 155 may be configured to determine whether a party on the call has invoked the AI virtual assistant 115, 125, 150, 155, 170a-170n. For example, in some embodiments, the monitoring device may be configured to monitor call audio for a wake word to be spoken by a participant on the call. A wake word may include a word configured to, when spoken, invoke and/or request an AI virtual assistant 115, 125, 150, 155, 170a-170n to join the call. Thus, when the monitoring device 120 and/or AI virtual assistant device 155 determines that a user has spoken the wake word, in some embodiments, the monitoring device 120 and/or AI virtual assistant device 155 may send a call invite to the webservice 165 and/or a specific AI virtual assistant instance 170a-170n, via the webservice/SIP stack 160. In further embodiments, a local AI virtual assistant 125, 115, 155, 150 may be joined into the call. In some further embodiments, the monitoring device 120 may additionally and/or alternatively be configured to determine whether a touch tone (e.g., dual-tone multi-frequency signaling) code configured to invoke the AI virtual assistant 115, 125, 150, 155, 170a-170n has been entered by a participant on the call. If it is determined that the touch tone code has been entered by a participant, the monitoring device 120 and/or AI virtual assistant device 155 may similarly send a call invite to the webservice 165 and/or a specific AI virtual assistant instance 170a-170n, via the webservice/SIP stack 160.

In some embodiments, the monitoring device 120 may be configured to invoke an AI virtual assistant instance 115, 125, 150, 155, 170a-170n. For example, in some embodiments, the monitoring device 120 may include an AI virtual assistant 125 instance. Alternatively, monitoring device 120 may invoke the webservice 165 via the webservice/SIP stack 160. For example, the monitoring device 120 may cause the SBC 105 to invite the webservice 165 to the call. Similarly, in some embodiment, the AI virtual assistant device 155 may be configured to invoke the webservice 165 via the webservice SIP stack 160. Thus, in some examples, the AI virtual assistant device 155 may generate an INVITE SIP message to be sent, via the recipient SBC 140, to the webservice/SIP stack 160, which may in turn invoke a respective AI virtual assistant instance 170a-170n of the webservice 165. Similarly, AI virtual assistant device 155 may be a combination of a monitoring device and a local AI virtual assistant instance.

Figure 2B:
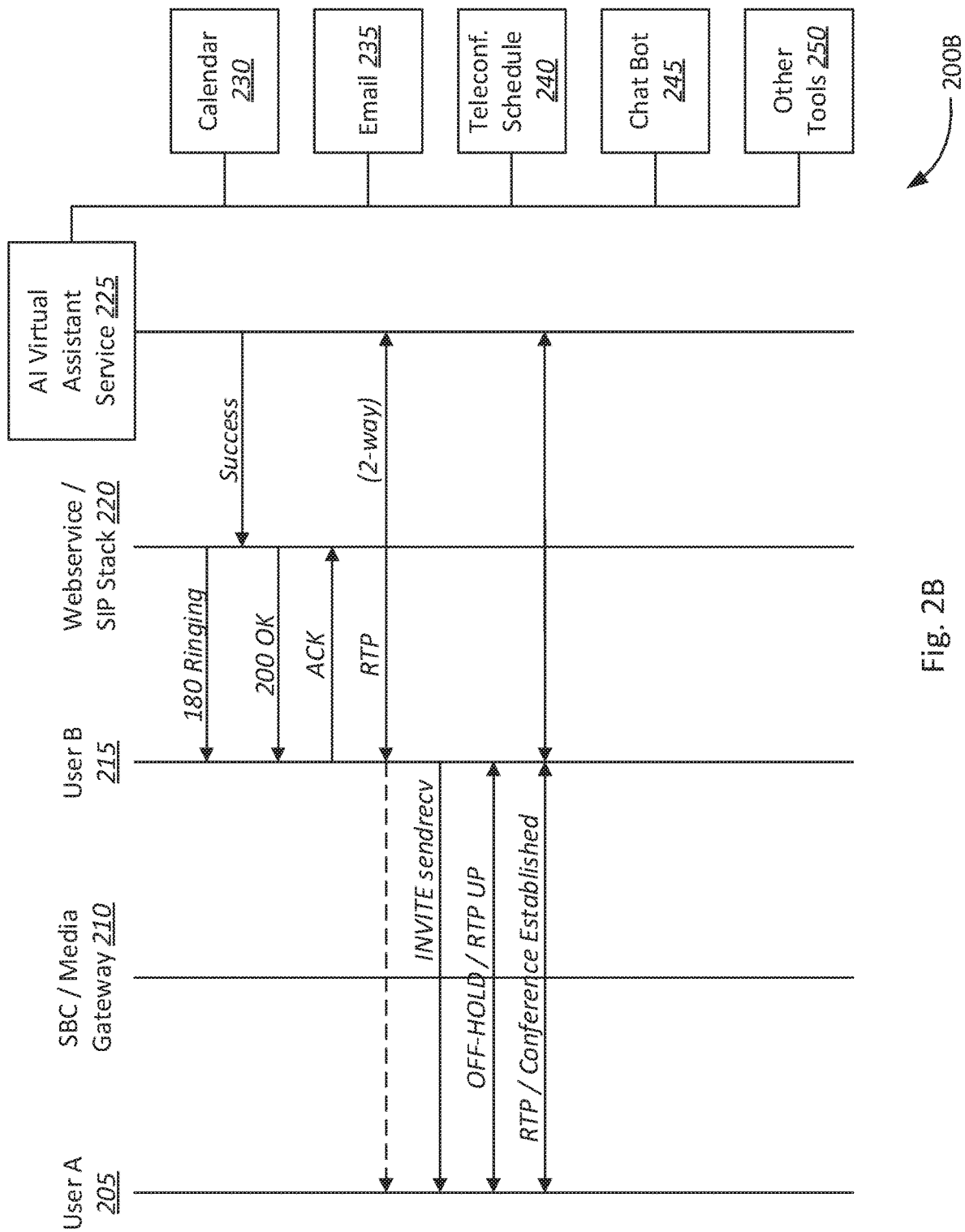
FIG. 2B is a sequence diagram of invoking an in-line AI virtual assistant, in accordance with various embodiments.

FIGS. 2A & 2B are sequence diagrams 200A, 200B of a process for invoking an in-line AI virtual assistant, in accordance with various embodiments. The sequence diagram 200A includes user A 205, SBC/media gateway 210, user B 215, webservice/SIP stack 220, and AI virtual assistant service 225. The AI virtual assistant service 225 may further be coupled to one or more tools and functionalities. The one or more tools and functionalities may include a calendar 230, email 235, teleconference schedule 240, a chat bot 245, and other tools 250. It should be noted that the various components of the sequence diagram 200A and 200B are schematically illustrated in FIGS. 2A & 2B, and that modifications to the sequence diagram 200A and 200B may be possible in accordance with various embodiments.

In various embodiments, the user A 205 may be a URI of an end-user device associated with a first user (user A). The SBC/media gateway 210 may be an SBC located and/or gateway device located between user A 205 and user B 215. For example, the SBC 210 may be an SBC located on a local network of the user A, or an SBC associated with a service provider providing voice service to one or more of user A 205 or user B 215. User B 215, therefore, may be a URI of a recipient device associated with a recipient (user B). The webservice/SIP stack 220 may be an SIP stack (including, without limitation, one or more of an SIP server, SBC, or media gateway) associated with a webservice. The webservice, in some embodiments, includes the AI virtual assistant service 225. Accordingly, the AI virtual assistant service 225 may include one or more AI virtual assistant instances that may be provisioned with a respective URI. Each AI virtual assistant instance may further be configured to access one or more additional tools, such as the calendar 230, email 235, teleconference schedule 240, chat bot 245, and/or other tools 250.

In various embodiments, the calendar 230 tool may be configured to access an electronic calendar associated with one or more participants of a call, including user A 205 and user B 215. Accordingly, the calendar tool 230 may be configured to interface with one or more electronic calendars associated with one or more of the user A 205 and user B 215. Furthermore, each of the one or more electronic calendars may be associated with respective service providers and/or electronic accounts. Similarly, email tool 235 may be configured to interface with one or more email accounts of one or more call participants, including user A 205 and user B 215. The calendar tool 230 and email tool 235 may be configured to allow an AI virtual assistant instance to access a calendar and/or email account, and access items within the calendar and/or email accounts, associated with one or more the call participants, as described above. The teleconference schedule tool 240 may include a schedule for a teleconference line on which the call participants may be conducting a call. The chat bot tool 245 may, in some embodiments, include a text-based and/or speech-to-text bot for communicating with call participants via text-based messages and/or data. The chat bot 245 may further include voice communication functionality configured to allow an AI virtual assistant instance to communicate using speech/audio data. In some embodiments, other tools 250 may include, without limitation, search functionality (e.g., web search), video and/or image analysis, voice analysis, file transfer, storage device interfaces, weather tools, and/or other application/service specific APIs to interface with various other applications and services.

In one set of embodiments, a call may begin with user A 205 placing a call to user B 215. Accordingly, the sequence diagram illustrates an exemplary set of SIP messages that may be passed between the various devices/components to place the call. For examples, to initiate a call, an INVITE request, INVITE B, may be sent by user A to the SBC/media gateway 210. The SBC/media gateway 210 may then route the call (e.g., the INVITE message) to user B 215. The SBC/media gateway 210 may reply to user A 205 with a response, 100 Trying, to indicate that the request has been received by the next-hop server (e.g., a subsequent SBC) and/or the user B 215. User B may respond to the SBC with a 180 Ringing response, indicating that the INVITE request is ringing/alerting user B 215. SBC 210 may forward the 180 Ringing response to user A 205. If the call is successful, user B 215 may submit a 200 OK response to the SBC/media gateway 210, indicating that the INVITE request as succeeded, which is in turn forwarded by the SBC/media gateway 210 to the user A 205. An ACK response may then be transmitted by the user A 215 to the user B 215, in response to the 200OK response. Although subsequent responses of the sequence diagram 200A, 200B are depicted as being transmitted directly to user A 205, user B 215, webservice/SIP stack 220, and AI virtual assistant service 225, it should be understood that messages may still traverse any intermediate next-hop servers during transmission to the intended destination.

Once an ACK response is receive, a 2-way real-time transport protocol (RTP) connection may be established between user A 205, and user B 215. The 2-way RTP connection may be configured to carry RTP media data, such as voice data between the user A 205 and user B 215. In some embodiments, RTP media data may further include, without limitation, other audio data, video data, and/or text data to be passed between connected parties.

As previously described, in various embodiments, a monitoring device may further be joined to the call. For example, in some embodiments, a monitoring device may be invited, via the webservice/SIP stack 220. In one example, the user B 215 may send a send-only request (INVITE sendonly) to user A, which causes user A 205 to send RTP media data, but not receive RTP media data. The user A 205 may send response 200 OK, at which point an ACK response may be sent by user B 215 to user A 205. Concurrently, the RTP connection may be put on hold, while user B sends an INVITE C request to a third party, in this example the webservice/SIP stack 220 of the AI virtual assistant service 225. It is to be understood that in other embodiments, the invite request to webservice/SIP stack 220 may originate from user A 205, in which case the user B 215 may be put in send-only mode. Alternatively, in some embodiments, in the case of a separate monitoring device, the separate monitoring device may be similarly be invited as a third party to the call. Once a wake word and/or DTMF code has been entered by a party to the call, the monitoring device may generate the invite request INVITE C to the webservice/SIP stack 220.

The webservice/SIP stack 220 may then send an InvokeAIservice request to the AI virtual assistant service 225, which may request that the AI virtual assistant service 225 provision an AI virtual assistant instance to be connected to the call. Thus, after sending the InvokeAIservice request, the webservice/SIP stack 220 may respond with a 180 Ringing response to user B 215 (or alternatively user A 205). Once the AI virtual assistant instance has been provisioned and able to be connected to the call, a Success response may be provided to the webservice/SIP stack 220. The webservice/SIP stack 200 may in turn provide a 200 OK response to the user B 215 (or alternatively user A 205, as the case may be). An ACK response may be sent to the webservice/SIP stack 220 in response, and a 2-way RTP connection established between the AI virtual assistant service 225 (e.g., the AI virtual assistant instance) and the user B 215 (or user A).

Once the RTP channel with the AI virtual assistant instance has been established, the user B 215 may send an INVITE sendrecv request to user A 205 to put the user A 205 back into both send and receive mode. The RTP connection between user A 205 and user b 215 may further be taken off-hold, and an RTP conference channel established between user A 205, user B 215, and the AI virtual assistant service 225 (in this case the AI virtual assistant instance provisioned to the call by the AI virtual assistant service 225).

In some embodiments, the AI virtual assistant instance may itself include a monitoring device for determining whether the AI virtual assistant has been invoked by a party on the call (e.g., a wake word spoken, or DTMF code entered). Once the AI virtual assistant has been invoked by a party, the AI virtual assistant may be configured to perform one or more actions in response to a query or command from one or more participants to the call. For example, the AI virtual assistant may be configured to utilize the one or more tools, such as calendar tool 230, email tool 235, teleconference schedule 240, chat bot 245, or other tools 250 as previously described.

Figure 3:
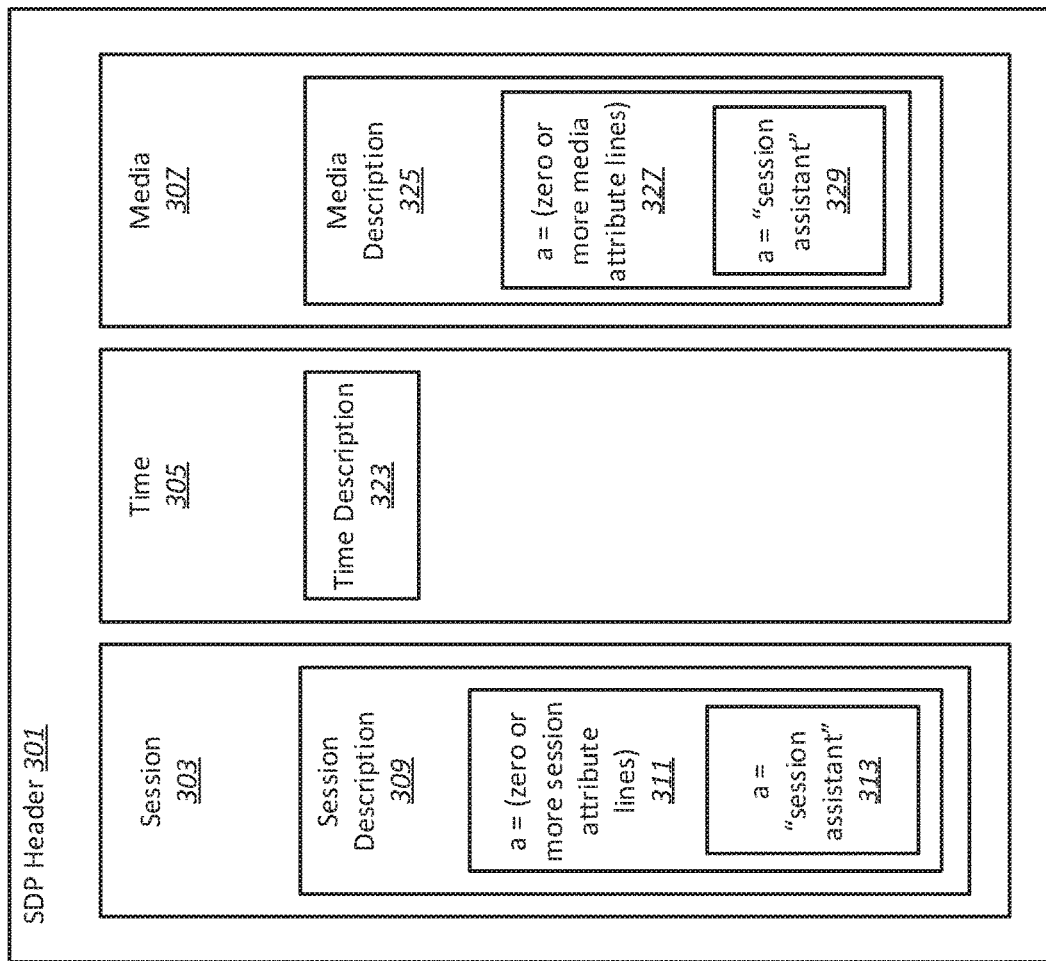
FIG. 3 is a table of SDP parameters for providing an in-line AI virtual assistant, in accordance with various embodiments.

FIG. 3 is a table of session description protocol (SDP) parameters 300 for providing an in-line AI virtual assistant, in accordance with various embodiments. The SDP parameters 300 may include session descriptions 303, time descriptions 305, and media descriptions 307. It should be noted that the various SDP parameters and description fields 300 are schematically illustrated in FIG. 3, and that modifications to the SDP parameters 300 may be possible in accordance with various embodiments.

Session description 303 may include one or more session description fields 309. The session description fields 309 may include various session description fields as known to those in the art, such as:
v=(protocol version)
o=(owner/creator and session identification)
s=(session name)
i=* (session information)
u=* (URI of description)
e=* (email address)
p=* (phone number)
c=* (connection information)
b=* (session bandwidth information)
z=* (time zone adjustments)
k=* (encryption key)

Similarly, time description 305 may include one or more time description fields 323 as known to those in the art. Time description fields 323 may include, without limitation:
t=* (time the session is active)
r=* (repeat times)

Media description 307 may include one or more media description fields 325. The one or more media description fields may include, without limitation:
m=(media name/transport address)
i=* (media title)
c=* (connection information)
b=* (bandwidth information)
k=* (encryption key)

In various embodiments, the one or more session description fields 309 may further include the field a=(zero or more session attribute lines) 311. Similarly, the one or more media description fields 325 may also include the field a=(zero or more media attribute lines) 327. In various embodiments, this session description field a="session assistant" 313 may be configured to invoke the AI virtual assistant. For example, in various embodiments, the InvokeAIservice request may be a SIP and/or SDP message that utilizes the SDP field a="session assistant" 313 as a trigger to create an INVITE request to a specific AI virtual assistant instance. Similarly, SIP and/or SDP messages may include media description field a="session assistant" 329 to further describe media Thus, the webservice/SIP stack (e.g., webservice/SIP stack 220 of FIG. 2) may accordingly be configured to support the trigger, which may include the specific session description field a="session assistant" 313 to designate/describe RTP media from/to an AI virtual assistant instance.

Figure 4:
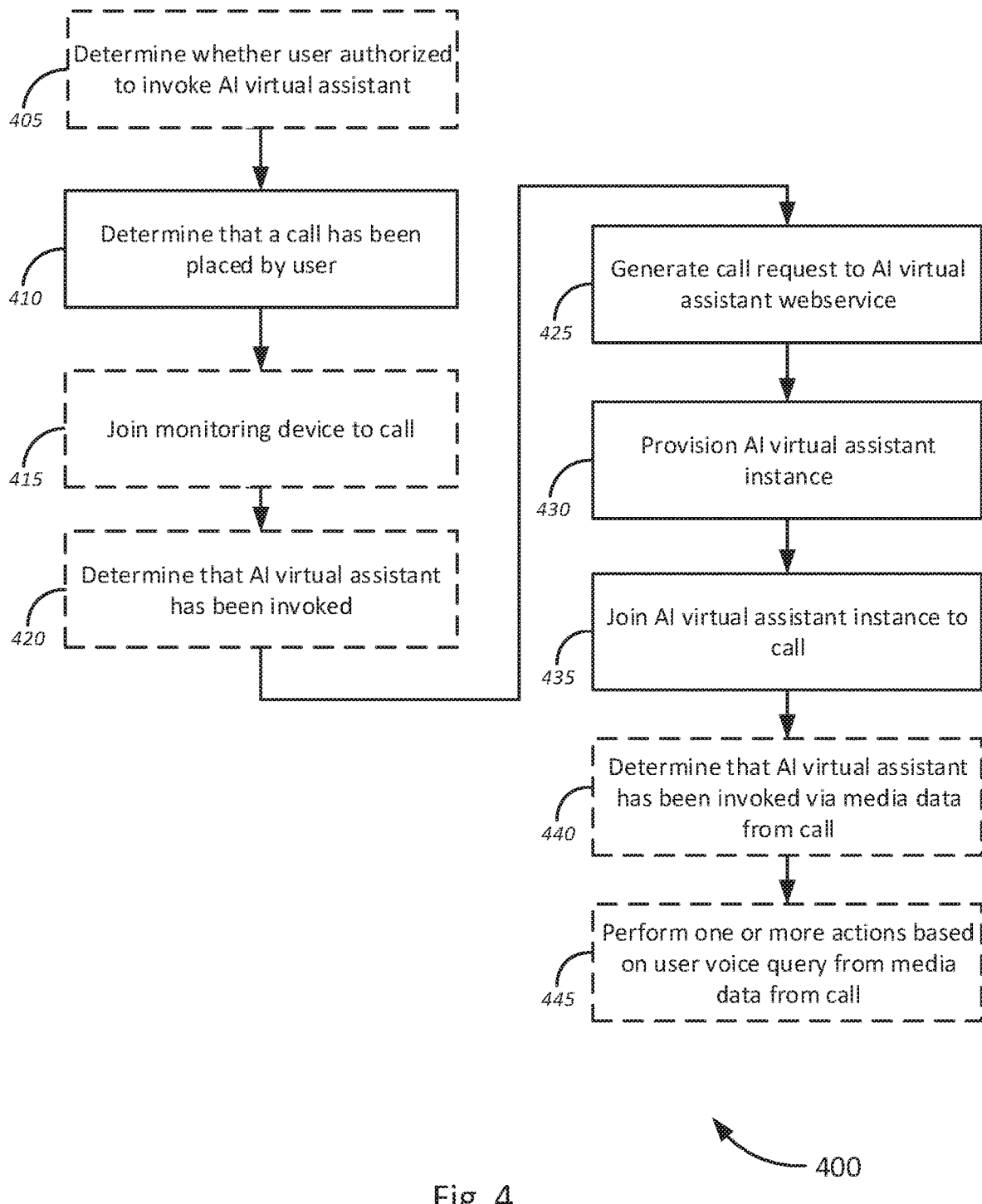
FIG. 4 is a flow diagram of a method for providing an in-line AI virtual assistant, in accordance with various embodiments.

FIG. 4 is a flow diagram of a method 400 for providing an in-line AI virtual assistant. The method 400 begins, at optional block 405, by determining whether a user is authorized to invoke an AI virtual assistant. As previously described, in some embodiments, an SBC may be configured to determine whether a user is authorized to invoke an AI virtual assistant. In other embodiments, a monitoring device may be configured to be connected to calls made by a user. The monitoring device may then be configured to whether the user is authorized to invoke the AI virtual assistant.

The method 400 continues, at block 410, by determining that a call has been placed by the user. Once it is determined that a call has been placed, the method may continue, at optional block 415, by joining a monitoring device to the call. As previously described, in some embodiments, the caller, call recipient, and/or an SBC may be configured to generate an invite request and/or otherwise cause a monitoring device to join the call.

At optional block 420, the monitoring device may determine whether the AI virtual assistant has been invoked. As previously described, the monitoring device may be configured to determine whether a participant on the call has spoken a wake word and/or entered a touch tone code for invoking the AI virtual assistant.

The method 400 continues, at block 425, by generating a call request to the AI virtual assistant webservice. As previously described, in some embodiments, a call participant and/or SBC may be configured to generate an INVITE request to be sent to the webservice/SIP stack associated with the AI virtual assistant. Thus, in effect, the call request is transmitted to a webservice/SIP stack. In some further embodiments, a separate monitoring device may be configured to generate a call invite (e.g., INVITE request) to the AI virtual assistant webservice. In other embodiments, the AI virtual assistant may itself act as a monitoring device once added to a call.

Accordingly, at block 540, the method continues by provisioning an AI virtual assistant instance to join the call. As previously described, the webservice may be configured to provision an AI virtual assistant instance in response to receiving an INVITE request from an authorized user and/or SBC associated with an authorized user of the AI virtual assistant webservice.

The method continues, at block 435, by joining the AI virtual assistant instance to the call. As previously described, the AI virtual assistant instance may be provisioned with a unique respective URI, and managed via the webservice/SIP stack. Accordingly, the webservice/SIP stack may be configured to establish a connection between AI virtual assistant instance and a caller. In some embodiments, joining the AI virtual assistant instance to the call may include establishing an RTP conference connection between at least 2 existing call parties, and/or a 2-way connection to a party invoking the AI virtual assistant.

At optional block 440, as previously described, the method 400 may continue by determining that the AI virtual assistant has been invoked via media data from the call. RTP media data may be analyzed by the AI virtual assistant, or alternatively a monitoring device. In some embodiments, determining that an AI virtual assistant has been invoked may include monitoring voice/audio data for wake words and/or a DTMF/touch tone code. In other embodiments, the AI virtual assistant may be configured to be invoked by text data transmitted over the call.

At optional block 445, in response to determining that the AI virtual assistant has been invoked, the method 400 may continue by performing one or more actions based on a user voice query and/or command as determined from the call voice data. In some embodiments, media data may include audio (e.g., voice), video, and/or text data.

Figure 5:
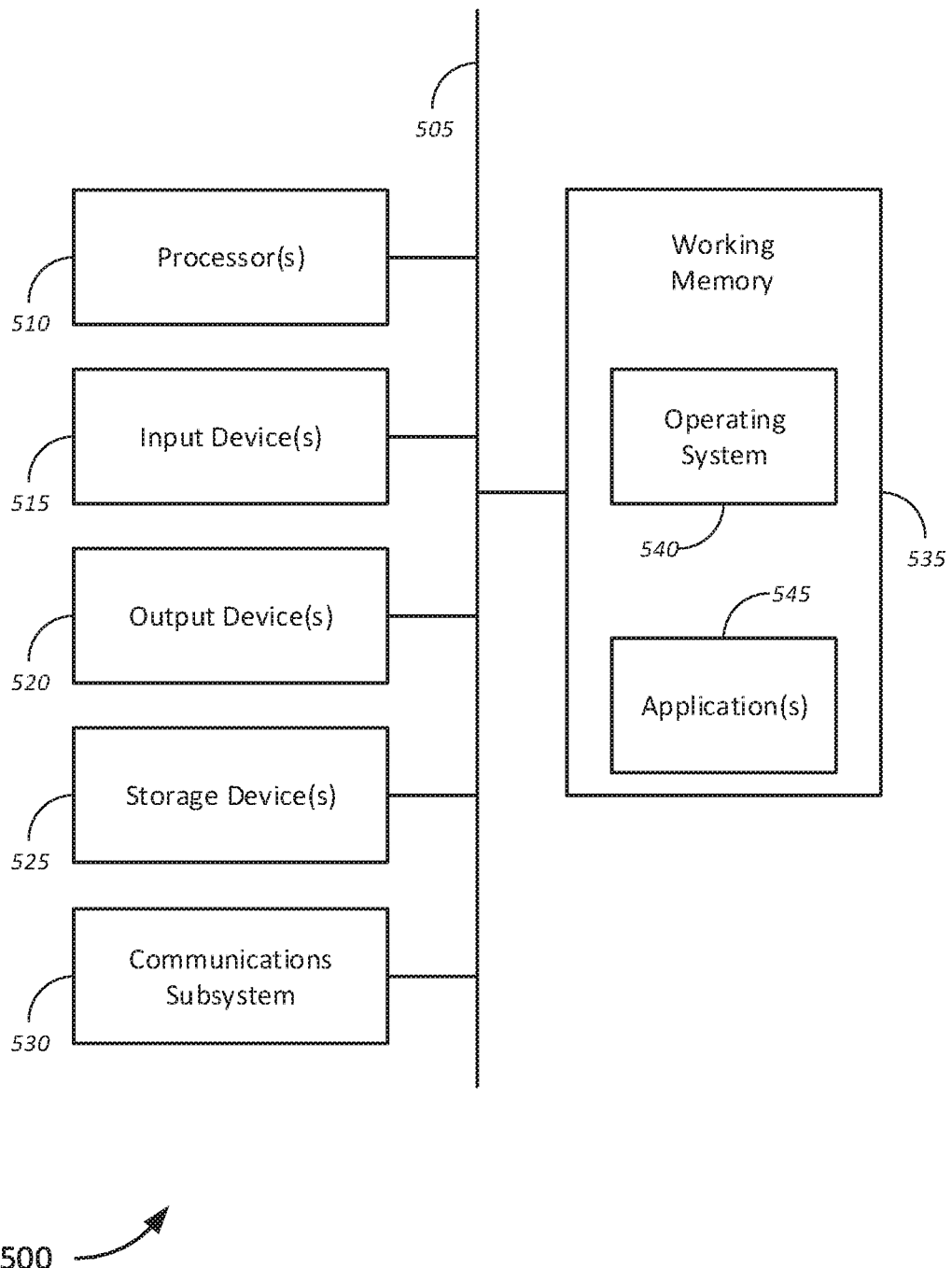
FIG. 5 is a schematic block diagram of a computer system for providing an in-line AI virtual assistant, in accordance with various embodiments.

FIG. 5 is a schematic block diagram of a computer system 500 for providing an in-line Ai virtual assistant, in accordance with various embodiments. The computer system 500 is a schematic illustration of a computer system (physical and/or virtual), such as an SBC, webservice/SIP stack, monitoring device, end-user device, AI virtual assistant instance, and/or dedicated AI virtual assistant device, which may perform the methods provided by various other embodiments, as described herein. It should be noted that FIG. 5 only provides a generalized illustration of various components, of which one or more of each may be utilized as appropriate. FIG. 5, therefore, broadly illustrates how individual system elements may be implemented in a relatively separated or relatively more integrated manner.

The computer system 500 includes multiple hardware (or virtualized) elements that may be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and microcontrollers); one or more input devices 515, which include, without limitation, a mouse, a keyboard, one or more sensors, and/or the like; and one or more output devices 520, which can include, without limitation, a display device, and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 500 may also include a communications subsystem 530, which may include, without limitation, a modem, a network card (wireless or wired), an IR communication device, a wireless communication device and/or chip set (such as a Bluetooth™ device, an 802.11 device, a WiFi device, a WiMax device, a WWAN device, a low-power (LP) wireless device, a Z-Wave device, a ZigBee device, cellular communication facilities, etc.). The communications subsystem 530 may permit data to be exchanged with a network (such as the network described below, to name one example), with other computer or hardware systems, between data centers or different cloud platforms, and/or with any other devices described herein. In many embodiments, the computer system 500 further comprises a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code may be encoded and/or stored on a non-transitory computer readable storage medium, such as the storage device(s) 525 described above. In some cases, the storage medium may be incorporated within a computer system, such as the system 500. In other embodiments, the storage medium may be separate from a computer system (i.e., a removable medium, such as a compact disc, etc.), and/or provided in an installation package, such that the storage medium can be used to program, configure, and/or adapt a general purpose computer with the instructions/code stored thereon. These instructions may take the form of executable code, which is executable by the computer system 500 and/or may take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) may also be used, and/or particular elements may be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 500) to perform methods in accordance with various embodiments of the invention. According to a set of embodiments, some or all of the procedures of such methods are performed by the computer system 500 in response to processor 510 executing one or more sequences of one or more instructions (which may be incorporated into the operating system 540 and/or other code, such as an application program 545 or firmware) contained in the working memory 535. Such instructions may be read into the working memory 535 from another computer readable medium, such as one or more of the storage device(s) 525. Merely by way of example, execution of the sequences of instructions contained in the working memory 535 may cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer system 500, various computer readable media may be involved in providing instructions/code to processor(s) 510 for execution and/or may be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computer system 500. These signals, which may be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally receives the signals, and the bus 505 then may carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510.

Figure 6:
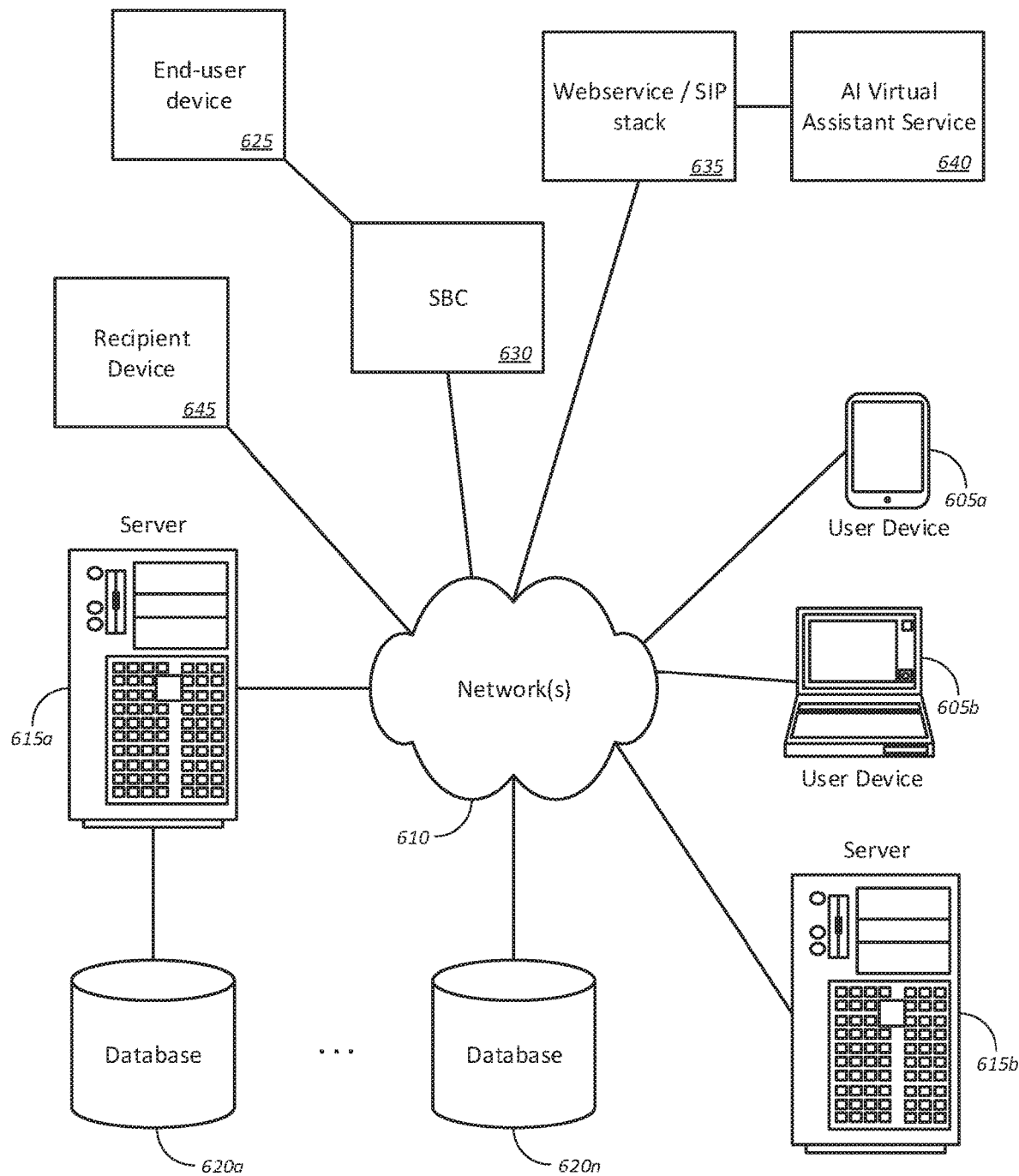
FIG. 6 is a schematic block diagram illustrating system of networked computer devices, in accordance with various embodiments.

FIG. 6 is a schematic block diagram illustrating system of networked computer devices, in accordance with various embodiments. The system 600 may include one or more user devices 605. A user device 605 may include, merely by way of example, desktop computers, single-board computers, tablet computers, laptop computers, handheld computers, edge devices, and the like, running an appropriate operating system. User devices 605 may further include external devices, remote devices, servers, and/or workstation computers running any of a variety of operating systems. A user device 605 may also have any of a variety of applications, including one or more applications configured to perform methods provided by various embodiments, as well as one or more office applications, database client and/or server applications, and/or web browser applications. Alternatively, a user device 605 may include any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user devices 605a-605b, any number of user devices 605 may be supported.

Certain embodiments operate in a networked environment, which can include a network(s) 610. The network(s) 610 can be any type of network familiar to those skilled in the art that can support data communications, such as an access network, core network, or cloud network, and use any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP, Bluetooth, Zigbee/Z-wave, TCP/IP, SNA™, IPX™, and the like.

Merely by way of example, the network(s) 610 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network may include an access network of the service provider (e.g., an Internet service provider ("ISP")). In another embodiment, the network may include a core network of the service provider, backbone network, cloud network, management network, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a data server, a web server, orchestration server, authentication server (e.g., TACACS, RADIUS, etc.), cloud computing device(s), or the like, as described above. The data server may include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, may include one or more application servers, which can be configured with one or more applications, programs, web-based services, or other network resources accessible by a client. Merely by way of example, the server(s) 615 can be one or more general purpose computers capable of executing programs or scripts in response to the user computers 605 and/or other servers 615, including, without limitation, web applications (which may, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* may reside on a storage medium local to (and/or resident in) a server 615*a* (or alternatively, user device 605). Alternatively, a database 620*n* can be remote so long as it can be in communication (e.g., via the network 610) with one or more of these. In a particular set of embodiments, a database 620 can reside in a storage-area network ("SAN") familiar to those skilled in the art. In one set of embodiments, the database 620 may be a relational database configured to host one or more data lakes collected from various data sources. The databases 620 may include SQL, no-SQL, and/or hybrid databases, as known to those in the art. The database may be controlled and/or maintained by a database server.

The system 600 may further include an end-user device 625, SBC 630, webservice/SIP stack 635, AI virtual assistant service 640, and recipient device 645. In various embodiments, the end-user device 625 may include a device from which a caller may place a call to the recipient device 645. Accordingly, the end-user device 625 may be coupled via the SBC 630 to the network 610. Recipient device 645, similarly, may be coupled to the network 610 via a respective SBC and/or media gateway. The webservice/SIP stack 635 may similarly couple the AI virtual assistant service 640 to the network 610.

As previously described, the end-user device 625 and/or the SBC 630 may be configured to generate a call invite to an AI virtual assistant instance 640 in response to a determination that the AI virtual assistant has been invoked during a call between the end-user device 625 and recipient device 645. The SBC 630 may then transmit the INVITE request to the webservice/SIP stack 635 for processing. For example, in some embodiments, the webservice/SIP stack 635 may be configured to determine whether participants on the call (e.g., the end-user device 625 and/or recipient device 645) is authorized to invoke the AI virtual assistant. The webservice/SIP stack 635 may then provision send a request to the AI virtual assistant service 640 to provision an AI virtual assistant instance to be connected to the call between the end-user device 625 and recipient device 645. Once provisioned, the webservice/SIP stack 635 may then connect the AI virtual assistant instance to the ongoing call, and an RTP conference connection may be established between the end-user device 625, recipient device 645, and the AI virtual assistant service 640 (e.g., an AI virtual assistant instance). As previously described, each AI virtual assistant instance may be assigned a respective URI to which a connection may be established. In further embodiments, the AI virtual assistant instance may be configured to receive queries and/or commands (e.g., a user input) based on RTP media data from the call, including, without limitation, voice/audio data, video data, and/or text data.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
a controller coupled to an end-user device, wherein the end-user device is configured to place a webservice call to a recipient device;
a webservice stack in communication with an in-line artificial intelligence (AI) virtual assistant service, the webservice stack comprising:
a processor; and
non-transitory computer readable media comprising instructions executable by the processor to:
receive, from the controller, a call invite request;
provision, via the AI virtual assistant service, an AI virtual assistant instance in response to the call invite request; and
join the AI virtual assistant instance to the webservice call with the end-user device,
wherein the AI virtual assistant instance is provisioned to have a respective uniform resource identifier, and
wherein the webservice stack is configured to connect the webservice call to the respective uniform resource identifier associated with the AI virtual assistant instance.

2. The system of claim 1, wherein the controller is configured to determine whether a user associated with the end-user device is authorized to access the AI virtual assistant service.

3. The system of claim 2, wherein, in response to determining that the user is authorized to access the AI virtual assistant service, one of the end-user device or the controller is configured to automatically generate and transmit the call invite request to the webservice stack.

4. The system of claim 1, wherein the instructions to provision the AI virtual assistant instance comprises instructions further executable by the processor to:
generate, in response to the call invite request, an invoke service request to the AI virtual assistant service;
transmit the invoke service request to the AI virtual assistant service, wherein the AI virtual assistant service is configured to provision the AI virtual assistant instance in response to the invoke service request.

5. The system of claim 1, wherein the instructions to join the AI virtual assistant instance to an ongoing call comprises instructions further executable by the processor to:
establish a real-time transport protocol 2-way connection between the end-user device and the AI virtual assistant instance; and
establish a real-time transport protocol conference connection between each of the end-user device, the recipient device, and the AI virtual assistant instance.

6. The system of claim 1 further comprising a monitoring device coupled to the controller,
wherein the monitoring device is configured to determine, based on call data from the webservice call, whether a participant on the webservice call has invoked the AI virtual assistant service, wherein the monitoring device is further configured to generate the call invite request; and
wherein the controller is configured to join the monitoring device to the webservice call when the webservice call is initiated by the end-user device.

7. The system of claim 6, wherein determining whether the participant on the webservice call has invoked the AI virtual assistant service includes determining whether the participant has performed at least one of speaking a wake word or entering a touch tone code.

8. The system of claim 1 wherein the AI virtual assistant instance is configured to determine whether a participant on the webservice call has invoked the AI virtual assistant instance, wherein determining whether the participant has invoked the AI virtual assistant instance includes determining whether the participant performed at least one of speaking a wake word or entering a touch tone code.

9. The system of claim 1, wherein the AI virtual assistant instance is configured to receive user input from media data of the webservice call received over a real-time transport protocol connection, wherein media data includes at least one of audio data, text data, or video data.

10. An apparatus comprising:
a processor; and
non-transitory computer readable media comprising instructions executable by the processor to:
receive, from a controller, a webservice call invite request;
provision, via an artificial intelligence (AI) virtual assistant service, an AI virtual assistant instance in response to the webservice call invite request, wherein the AI virtual assistant is provisioned with a respective uniform resource identifier;
join the AI virtual assistant instance to a webservice call with an end-user device;
register the uniform resource identifier associated with the AI virtual assistant instance; and
connect the uniform resource identifier associated with the AI virtual assistant to the webservice call.

11. The apparatus of claim 10, wherein the instructions to provision the AI virtual assistant instance further comprises instructions executable by the processor to:
generate, in response to the call invite request, an invoke service request to the AI virtual assistant service;
transmit the invoke service request to the AI virtual assistant service, wherein the AI virtual assistant service is configured to provision the AI virtual assistant instance in response to the invoke service request.

12. The apparatus of claim 10, wherein the instructions to join the AI virtual assistant instance to an ongoing call comprises instructions further executable by the processor to:
establish a real-time transport protocol 2-way connection between the end-user device and the AI virtual assistant instance.

13. The apparatus of claim 10, wherein the instructions to join the AI virtual assistant instance to an ongoing call comprises instructions further executable by the processor to:
establish a real-time transport protocol conference connection between each of the end-user device, a recipient device, and the AI virtual assistant instance.

14. The apparatus of claim 10, wherein the instructions are further executable by the processor to:
determine whether a user associated with the end-user device is authorized to access the AI virtual assistant service.

15. A method comprising:
receiving, from a controller, a call invite request;
provisioning, via an AI virtual assistant service, an artificial intelligence (AI) virtual assistant instance in response to the call invite request, wherein the AI virtual assistant is provisioned with a respective uniform resource identifier;
joining, via a webservice stack, the AI virtual assistant instance to a webservice call with an end-user device;
registering, via the webservice stack, the uniform resource identifier associated with the AI virtual assistant instance; and
connecting, via the webservice stack, the uniform resource identifier associated with the AI virtual assistant to the webservice call.

16. The method of claim 15, further comprising:
generating, via the webservice stack and in response to the call invite request, an invoke service request; and
transmitting, via the webservice stack, the invoke service request to the AI virtual assistant service, wherein the AI virtual assistant service is configured to provision the AI virtual assistant instance in response to the invoke service request.

17. The method of claim 15, further comprising:
establishing, via the webservice stack, a real-time transport protocol 2-way connection between the end-user device and the AI virtual assistant instance; and
establishing, via the webservice stack, al real-time transport protocol conference connection between each of the end-user device, a recipient device, and the AI virtual assistant instance.

* * * * *